United States Patent
Chang

(10) Patent No.: US 6,869,381 B2
(45) Date of Patent: Mar. 22, 2005

(54) GEARBOX DEVICE HAVING CERAMIC-INCORPORATING OIL SEAL UNITS

(75) Inventor: Robin C. S. Chang, Taichung (TW)

(73) Assignee: Apex Dynamics Inc., Taichung (TW)

(*) Notice: Subject to any disclaimer, the term of this patent is extended or adjusted under 35 U.S.C. 154(b) by 0 days.

(21) Appl. No.: 10/443,773

(22) Filed: May 23, 2003

(65) Prior Publication Data

US 2004/0235609 A1 Nov. 25, 2004

(51) Int. Cl.[7] .................. F16H 57/08; F16H 57/02; F16J 15/34
(52) U.S. Cl. .................. 475/346; 74/606 R; 277/405
(58) Field of Search .................. 74/606 R; 475/159, 475/335, 346; 184/6.12; 277/345–46, 352–53, 358, 361, 364, 405

(56) References Cited

U.S. PATENT DOCUMENTS

| | | | | |
|---|---|---|---|---|
| 2,853,323 A | * | 9/1958 | Engelking et al. | 277/405 |
| 3,550,969 A | * | 12/1970 | Hall et al. | 277/405 |
| 3,751,049 A | * | 8/1973 | Busby et al. | 277/405 |
| 3,904,211 A | * | 9/1975 | Dega | 277/405 |
| 3,926,443 A | * | 12/1975 | Fenerty et al. | 277/405 |
| 4,788,885 A | * | 12/1988 | Fries | 74/606 R |
| 5,094,466 A | * | 3/1992 | Baker et al. | 277/384 |
| 5,806,371 A | * | 9/1998 | Hibbler et al. | 475/346 |
| 5,813,938 A | * | 9/1998 | Forster | 475/346 |
| 5,826,884 A | * | 10/1998 | Anderton et al. | 277/346 |

* cited by examiner

Primary Examiner—Roger Pang
(74) Attorney, Agent, or Firm—Foley & Lardner LLP

(57) ABSTRACT

In a gearbox device, a housing is formed with a hole-confining wall portion. A shaft is mounted rotatably in the hole-confining wall portions. An oil seal unit is mounted in the housing to provide a liquid tight seal between the shaft and the hole-confining wall portion. The oil seal unit includes an annular rubber seal member and an annular ceramic member. The ceramic member is disposed radially and inwardly of the rubber seal member and is in contact with the rubber seal member. The ceramic member disposed in the rubber seal member is sleeved on and is fixed to the shaft. The rubber seal member disposed outwardly of the ceramic member is fixed to the hole-confining wall portion.

3 Claims, 3 Drawing Sheets

GEARBOX DEVICE HAVING CERAMIC-INCORPORATING OIL SEAL UNITS

BACKGROUND OF THE INVENTION

1. Field of the Invention

The invention relates to a gearbox device, more particularly to a gearbox device having ceramic-incorporating oil seal units.

2. Description of the Related Art

Referring to FIG. 1, a conventional gearbox device includes a tubular housing 1 formed with an axial hole 101 that is defined by first and second hole-confining wall portions 104, 105 opposite to each other along a hole axis of the axial hole 101 and a ring gear portion 103 between the first and second hole-confining wall portions 104, 105, an input shaft 3 mounted rotatably in the first hole-confining wall portion 104, an output shaft 4 mounted rotatably in the second hole-confining wall portion 105, and two oil seals 2, one of which is mounted in the axial hole 101 to provide a liquid tight seal between the input shaft 3 and the first hole-confining wall portion 104, and the other one of which is mounted in the axial hole 101 to provide a liquid tight seal between the output shaft 4 and the second hole-confining wall portion 105. The output shaft 4 has a planet carrier 402 and a set of planet gears 403 mounted on the planet carrier 402. The planet gears 403 mesh with the ring gear portion 103. The input shaft 3 has a sun gear 302 meshing with the set of planet gears 403. The output shaft 4 has a nut 404 mounted thereon for retaining an output bearing in the axial hole 101, the nut 404 being in contact with a corresponding one of the oil seals 2.

The following are some of the drawbacks of the conventional gearbox device:

1. The input shaft 3 and the nut 404 are usually made of alloy steel that has a surface roughness of 0.4 $\mu$m. According to an actual test, when the input and output shafts 3, 4 are operated at a speed of 3000 rpm, the oil seals 2, which are made mainly of rubber, wear out after about 20000 hrs as a result of contact with the input shaft 3 and the nut 404. Therefore, the conventional gearbox device is not suitable for applications with a high-speed requirement, such as a printing machine or a weaving machine.

2. Alloy steel has a Vickers hardness of about 450~600 Hv. As such, after a period of time, the surface roughness of the input shaft 3 and the nut 404 is easily damaged such that the service life of the rubber oil seals 2 is further shortened.

SUMMARY OF THE INVENTION

Therefore, the object of the present invention is to provide a gearbox device having ceramic-incorporating oil seal units that can reduce wearing so as to extend the service life of the same.

According to the present invention, a gearbox device comprises:

a housing formed with a hole-confining wall portion;

a shaft mounted rotatably in the hole-confining wall portion; and a oil seal unit mounted in the housing to provide a liquid tight seal between the shaft and the hole-confining wall portion;

wherein the oil seal unit includes an annular rubber seal member and an annular ceramic member, the ceramic member being disposed radially and inwardly of the rubber seal member and being in contact with the rubber seal member, the ceramic member disposed in the rubber seal member being sleeved on and being fixed to the shaft, the rubber seal member disposed outwardly of the ceramic member being fixed to the hole-confining wall portion.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
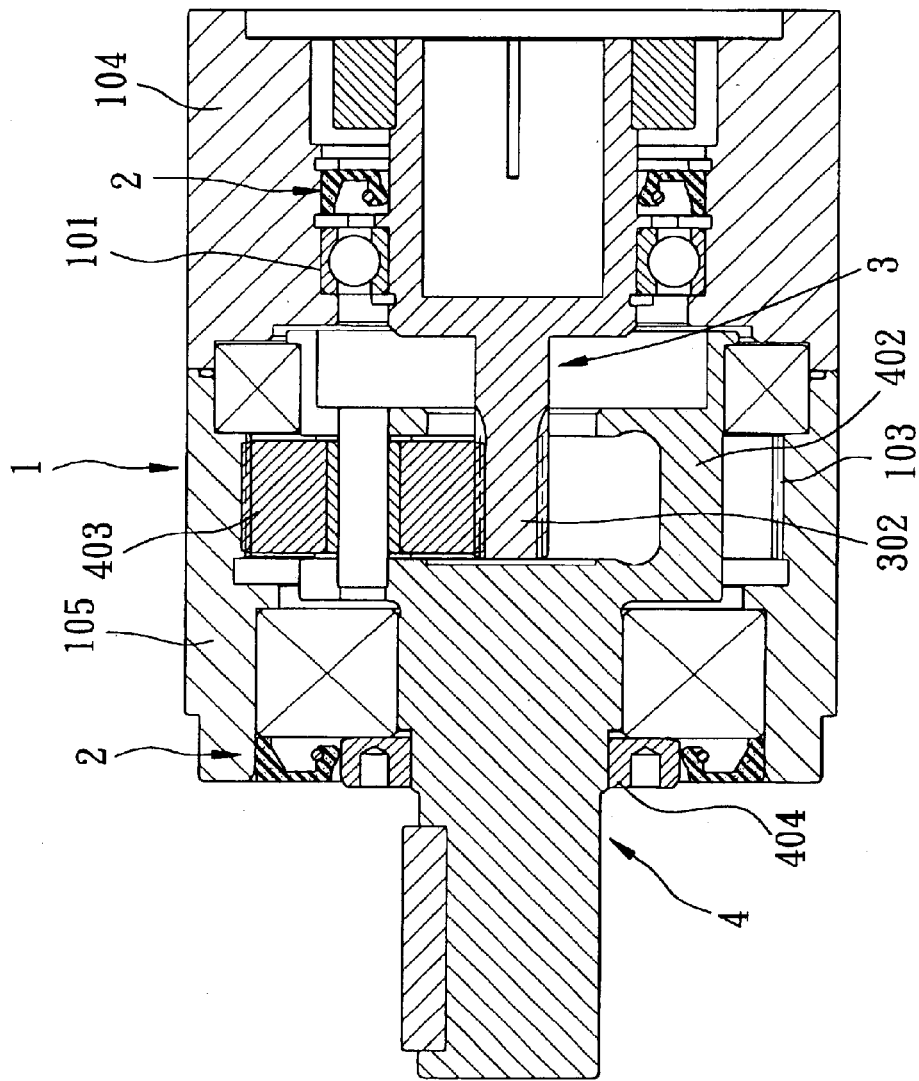
FIG. 1 is a schematic sectional view of a conventional gearbox device.

Before the present invention is described in greater detail, it should be noted that like elements are denoted by the same reference numerals throughout the disclosure.

Figure 2:
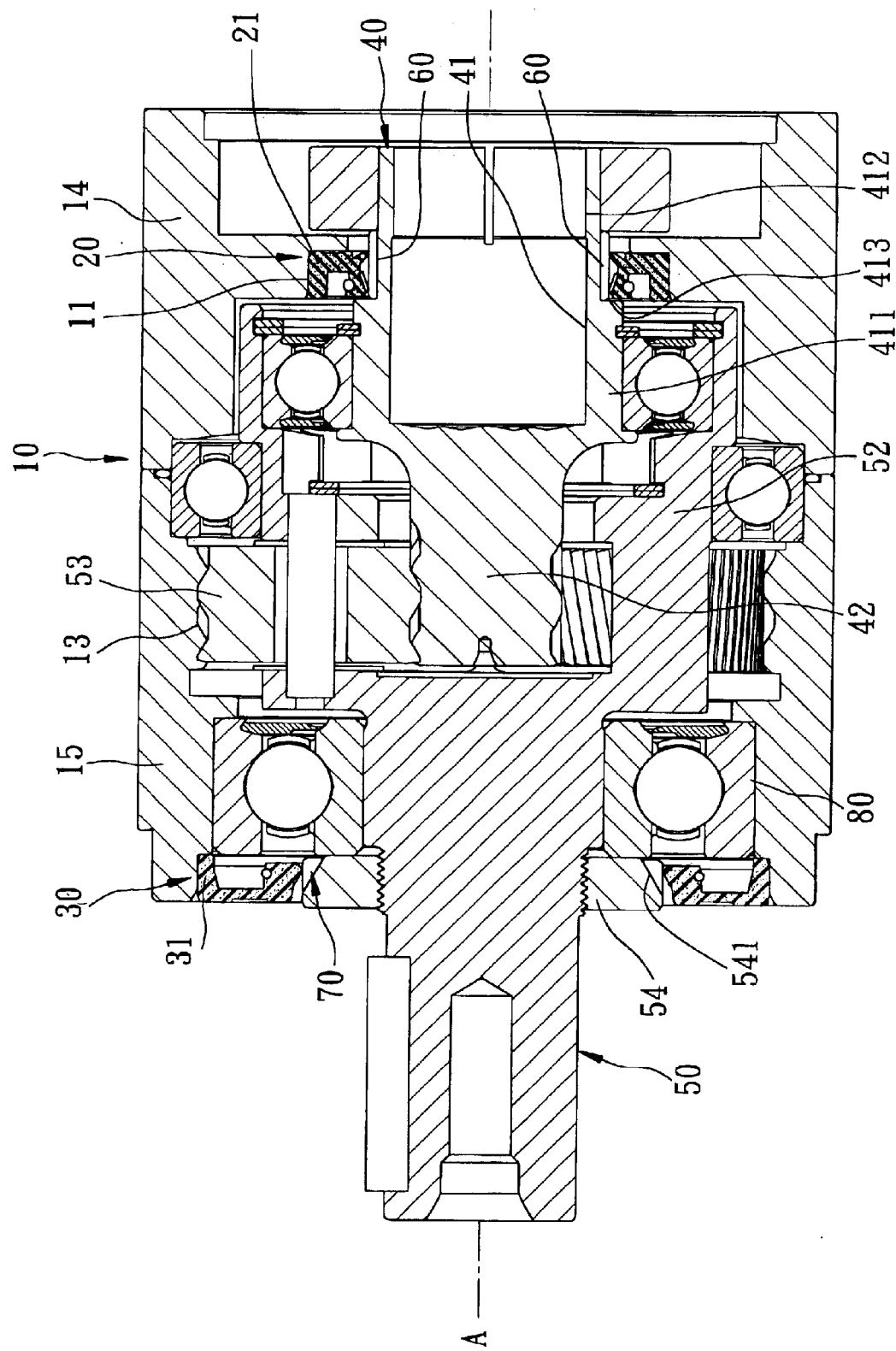
FIG. 2 is a schematic sectional view showing the first preferred embodiment of a gearbox device according to the present invention.

Referring to FIG. 2, the first preferred embodiment of a gearbox device according to the present invention is shown to include a tubular housing 10, an input shaft 40, an output shaft 50, a first oil seal unit 20, and a second seal unit 30.

The housing 10 is formed with an axial hole 11. The axial hole 11 has a hole axis (A) and is defined by first and second hole-confining wall portions 14, 15 opposite to each other along the hole axis (A). The housing 10 further has a ring gear portion 13 between the first and second hole-confining wall portions 14, 15.

The input shaft 40 is mounted rotatably in the first hole-confining wall portion 14. The input shaft 40 has a tubular coupling section 41 adapted to couple with and to be driven by an output shaft (not shown) of a motor, and a sun gear 42 connected to the coupling section 41. In this embodiment, the coupling section 41 has a small-diameter portion 412, a large-diameter portion 411, and a shoulder 413 between the small-diameter portion 412 and the large-diameter portion 411.

The output shaft 50 is mounted rotatably in the second hole-confining wall portion 15. The output shaft 50 has a planet carrier 52 and a set of planet gears 53 mounted on the planet carrier 52. The planet gears 53 mesh with the ring gear portion 13. The sun gear 42 of the input shaft 40 meshes with the planet gears 53. An output bearing 80 is disposed in the axial hole 11 for mounting rotatably the output shaft 50 in the second hole-confining wall portion 15. The output shaft 50 has a nut 54 mounted thereon for retaining the output bearing 80 in the axial hole 11. In this embodiment, the nut 54 has an outer beveled peripheral surface 541.

The first oil seal unit 20 is mounted in the axial hole 11 to provide a liquid tight seal between the input shaft 40 and the first hole-confining wall portion 14. The first oil seal unit 20 includes an annular rubber seal member 21 and an annular ceramic member 60. In this embodiment, the ceramic member 60 is disposed radially and inwardly of the rubber seal member 21 that is fixed to the first hole-confining wall portion 14, and is in contact with the rubber seal member 21. The ceramic member 60 is sleeved on the input shaft 40 after sintering. The ceramic member 60 is connected fixedly to the small-diameter portion 412 of the coupling section 41 of the input shaft 40 by means of an adhesive (not shown), and abuts against the shoulder 413 of the coupling section 41 of the input shaft 40.

The second oil seal unit 30 is mounted in the axial hole 11 to provide a liquid tight seal between the output shaft 50 and the second hole-confining wall portion 15. The second oil seal unit 40 includes an annular rubber seal member 31 and an annular ceramic member 70. In this embodiment, the ceramic member 70 is disposed in and is in contact with the rubber seal member 31 that is fixed to the second hole-confining wall portion 15. The ceramic member 70 is disposed around the nut 54 after sintering. The ceramic member 70 has an inner beveled peripheral surface connected fixedly to the nut 54 at the outer beveled peripheral surface 541 by means of an adhesive (not shown).

The ceramic members 60, 70 can be made of aluminum oxide or silicon nitride such that the ceramic members 60, 70 have a Vickers hardness not less than 1700 Hv, and a surface roughness not greater than 0.2 μm.

Figure 3:
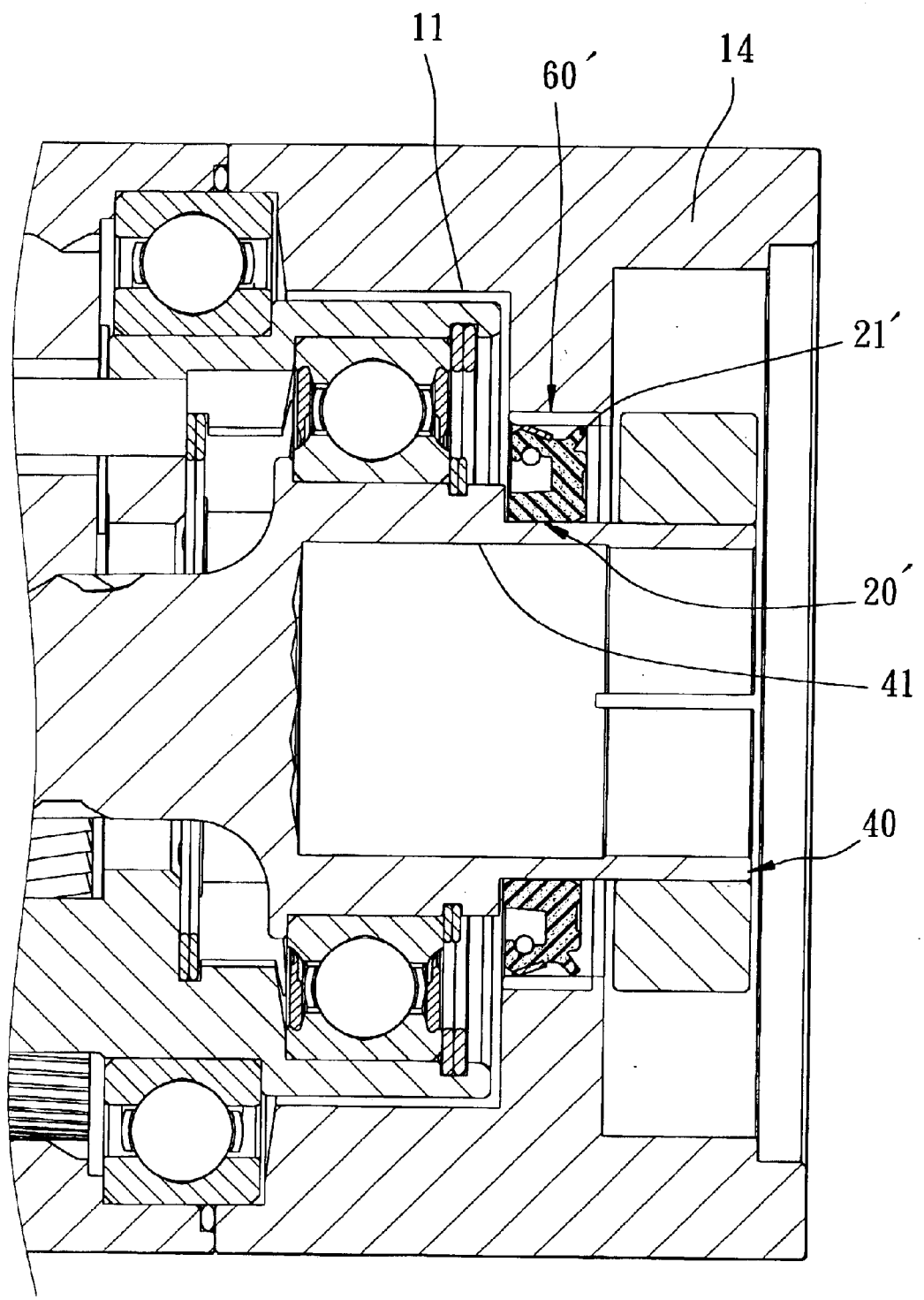
FIG. 3 is a fragmentary schematic sectional view showing the second preferred embodiment of a gearbox device according to the present invention.

FIG. 3 illustrates the second preferred embodiment of a gearbox device according to this invention, which is a modification of the first preferred embodiment. Unlike the previous embodiment, the rubber seal member 21' of the first oil seal unit 20' is disposed radially and inwardly of the ceramic member 60', and is sleeved tightly on the coupling section 41 of the input shaft 40. The ceramic member 60' is connected fixedly to the first hole-confining wall portion 14.

The following are some of the advantages attributed to the gearbox device of the present invention:

1. Since the ceramic members 60, 60', 70 have the surface roughness not greater than 0.2 μm and less than that of the abovementioned conventional alloy steel, there is less friction between the ceramic member 60, 60' and the rubber seal member 21, 21', and between the ceramic member 70 and the rubber seal member 31 so as to reduce wearing of the rubber seal members 21, 21', 31. In an actual test, the service life of the first and second oil seal units 20, 30 can be as long as 50000 hrs even when the input and output shafts 40, 50 are operated at a speed of 6000 rpm. Therefore, the gearbox device of this invention can be used in applications with a high-speed requirement, such as a printing machine or a weaving machine.

2. Since the ceramic members 60, 60', 70 have the Vickers hardness not less than 1700 Hv and greater than that of the abovementioned conventional alloy steel, after a period of time, the surface roughness of the ceramic members 60, 60' 70 is hardly damaged such that the service life of the first and second oil seal units 20, 30 can be prolonged.

3. The ceramic members 60, 60', 70 have a thermal conductivity greater than that of the above-mentioned conventional alloy steel. As such, the ceramic members 60, 60', 70 can efficiently dissipate heat generated by friction between the ceramic members 60, 60', 70 and the rubber seal members 21, 21', 31.

4. Since the ceramic members 60, 60', 70 can be further coated with lubricant after sintering, the friction between the ceramic member 60, 60' and the rubber seal member 21, 21', and between the ceramic member 70 and the rubber seal member 31 can be further reduced.

5. The ceramic members 60, 60', 70 have stable chemical characteristics and anti-corrosion characteristics.

It is noted that the gearbox device of this invention is not limited to a planetary gearbox device as described in the embodiments.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A gearbox device comprising:
    a housing formed with first and second hole-confining wall portions;
    an input shaft mounted rotatably in said first hole-confining wall portion;
    an output shaft mounted rotatably in said second hole-confining wall portion and having a nut mounted thereon;
    an output bearing disposed in said housing for mounting rotatably said output shaft in said second hole-confining wall portion, said nut retaining said output bearing in said housing;
    a first oil seal unit mounted in said housing to provide a liquid tight seal between said input shaft and said first hole-confining wall portion; and
    a second oil seal unit mounted in said housing to provide a liquid tight seal between said output shaft and said second hole-confining wall portion;
    wherein at least one of said first and second oil seal units includes an annular rubber seal member, and an annular ceramic member disposed radially and inwardly of said rubber seal member, said ceramic member being in contact with said rubber seal member and being fixed to a corresponding one of said input and output shafts, said ceramic member being disposed around and being connected fixedly to said nut, said rubber seal member being fixed to a corresponding one of said first and second hole-confining wall portions.

2. The gearbox device as claimed in claim 1, wherein said nut has an outer beveled peripheral surface, said ceramic member having an inner beveled surface fixed to said nut at said outer beveled peripheral surface.

3. A gearbox device comprising:
    a housing formed with first and second hole-confining wall portions and having a ring gear portion between said first and second hole-confining wall portions;
    an input shaft mounted rotatably in said first hole-confining wall portion and having a sun gear;
    an output shaft mounted rotatably in said second hole-confining wall portion and having a planet carrier, and a set of planet gears mounted on said planet carrier, said set of planet gears meshing with said ring gear portion, said sun gear meshing with said set of planet gears;
    a first oil seal unit mounted in said housing to provide a liquid tight seal between said input shaft and said first hole-confining wall portion; and
    a second oil seal unit mounted in said housing to provide a liquid tight seal between said output shaft and said second hole-confining wall portion;
    wherein at least one of said first and second oil seal units includes an annular rubber seal member and an annular ceramic member, one of said rubber seal member and said ceramic member being disposed in and being in contact with the other one of said ceramic member and said rubber seal member, said one of said rubber seal member and said ceramic member disposed in the other one of said rubber seal member and said ceramic member being fixed to a corresponding one of said input and output shafts, the other one of said rubber seal member and said ceramic member disposed outwardly of said one of said rubber seal member and said ceramic member being fixed to a corresponding one of said first and second hole-confining wall portions.

* * * * *